United States Patent

Lembo et al.

[11] 4,191,644
[45] Mar. 4, 1980

[54] REGENERATION OF MIXED RESIN BED USED FOR CONDENSATE POLISHING

[75] Inventors: Michael J. Lembo, Scotch Plains; James Y. Chen, Livingston, both of N.J.

[73] Assignee: Belco Pollution Control Corporation, Parsippany, N.J.

[21] Appl. No.: 905,078

[22] Filed: May 11, 1978

[51] Int. Cl.² .............................................. B01D 15/06
[52] U.S. Cl. ............................................ 210/33; 521/26
[58] Field of Search .................... 210/30 R, 32, 33, 35, 210/189, 275; 521/26

[56] References Cited

U.S. PATENT DOCUMENTS

| | | | |
|---|---|---|---|
| 2,563,006 | 8/1951 | Collier | 127/46 |
| 2,697,724 | 12/1954 | Collier | 260/527 |
| 3,385,787 | 5/1968 | Crits et al. | 210/32 |
| 3,429,807 | 2/1969 | Burgess | 210/33 |
| 3,501,401 | 3/1970 | Calmon | 210/33 |
| 3,527,718 | 9/1970 | Coburn | 210/35 |
| 3,582,504 | 6/1971 | Salem et al. | 210/33 |
| 3,583,908 | 6/1971 | Crits | 210/32 |
| 3,634,229 | 1/1972 | Stanley | 210/33 |
| 3,709,818 | 1/1973 | Gustafson et al. | 210/32 |
| 3,826,761 | 7/1974 | Short | 210/33 |
| 4,039,443 | 8/1977 | Tahara et al. | 210/32 |
| 4,120,786 | 10/1978 | Petersen et al. | 210/33 |

Primary Examiner—Charles N. Hart
Assistant Examiner—Ivars Cintins
Attorney, Agent, or Firm—Marvin A. Naigur; John E. Wilson; John J. Herguth, Jr.

[57] ABSTRACT

A process is disclosed in which a spent mixed anion/cation exchange resin bed is hydraulically separated into cation, anion and interface resin cuts. The interface resin cut is further classified by various physical separation techniques. Cation and anion resins are separately chemically regenerated. In an alternative embodiment cation resin fines are physically separated from the anion resin cut.

9 Claims, 12 Drawing Figures

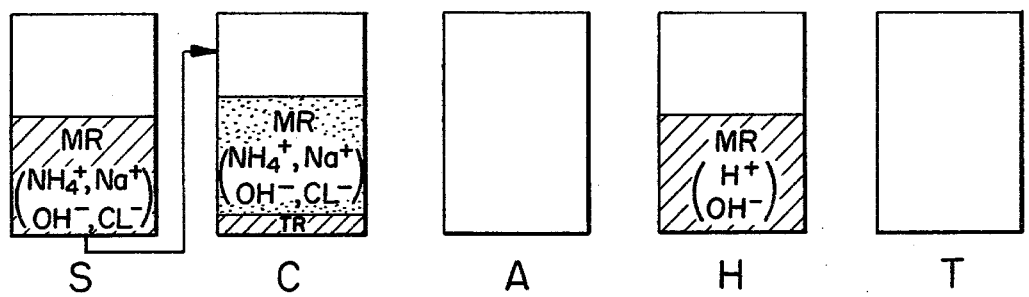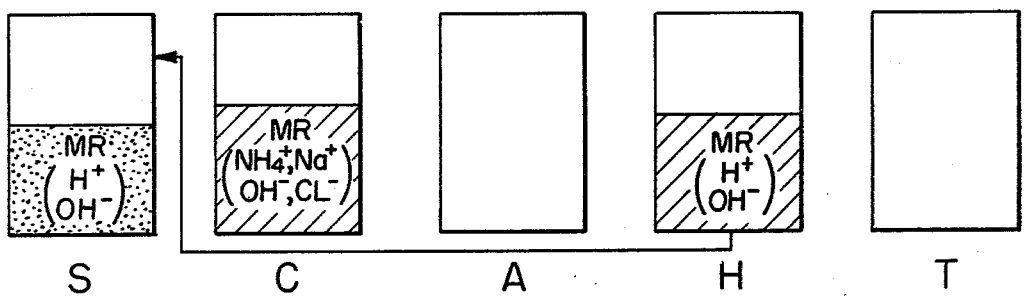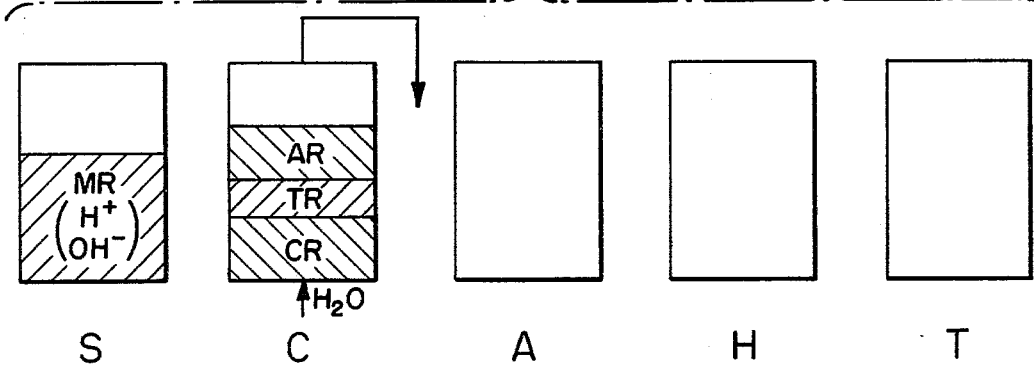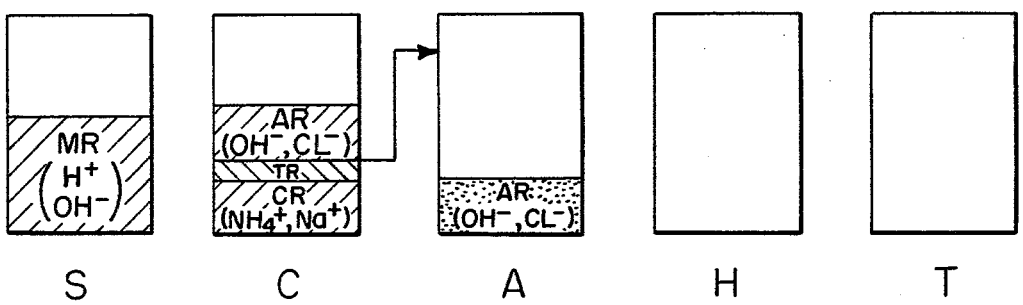

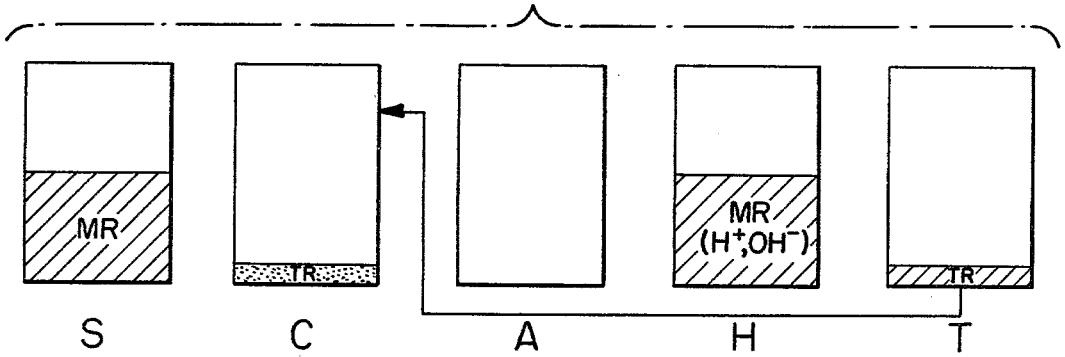
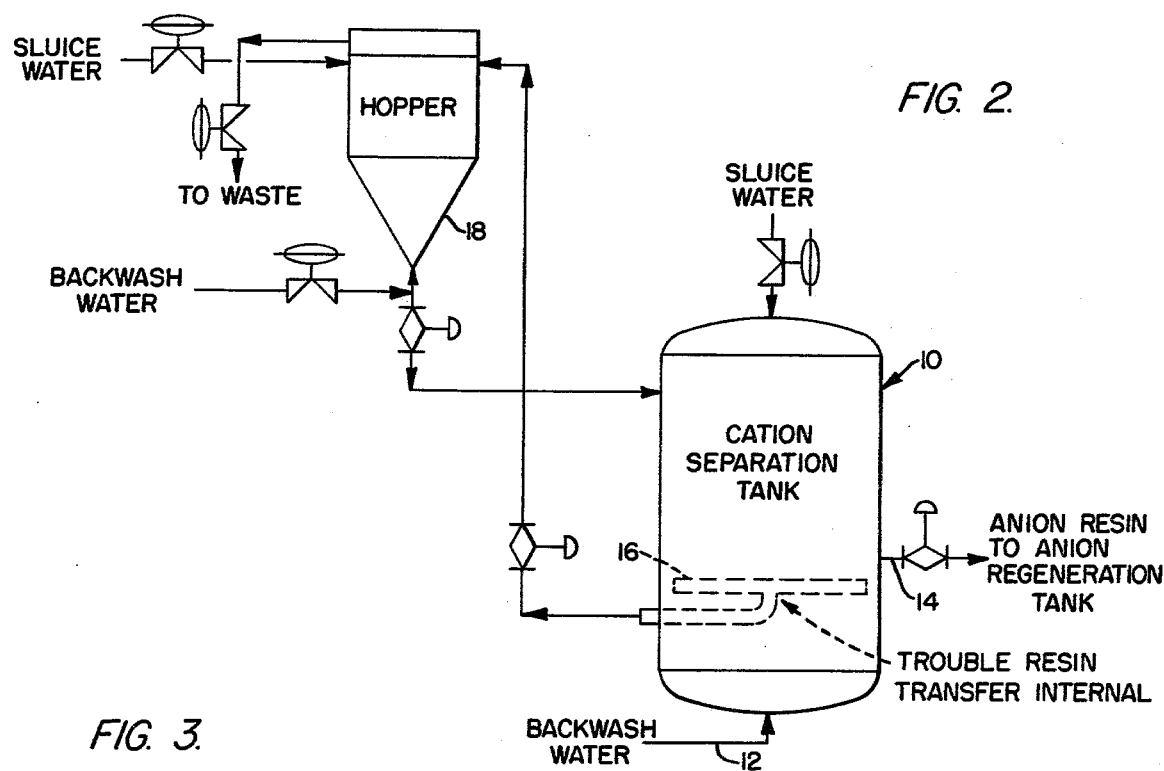
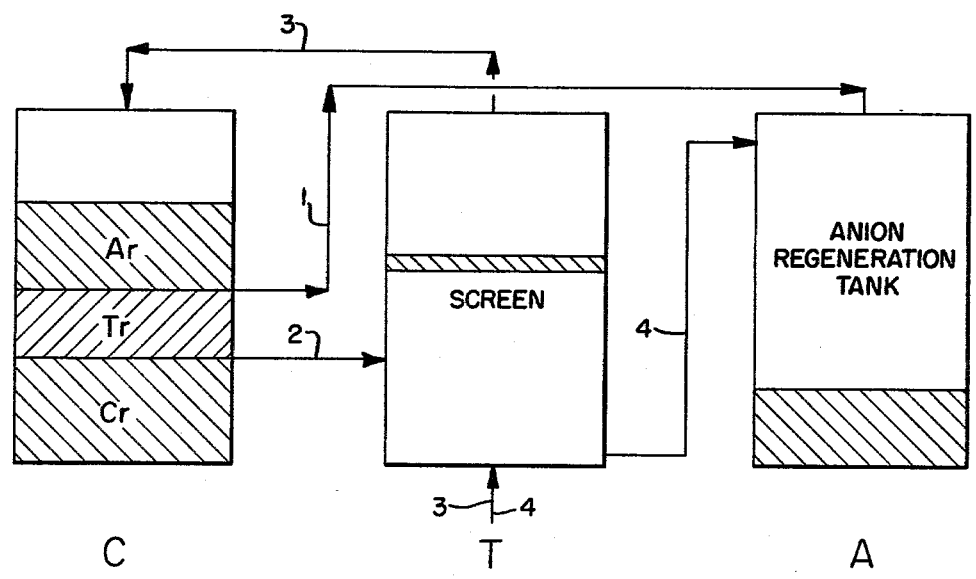

REGENERATION OF MIXED RESIN BED USED FOR CONDENSATE POLISHING

BACKGROUND OF THE INVENTION

The present invention relates to an improved method for separating a spent or partially spent mixed-resin bed into cation-exchange resin and anion-exchange resin portions for separate regeneration with an acid and a base, respectively. The present invention finds particular utility in a "condensate polishing system" used in conjunction with a steam generating unit, e.g., a steam turbine power system, for the purpose of removing trace corrosion and erosion products from condensate water. The "condensate polishing system" will consist of one or more service units and at least two regeneration units. When the ion exchange resin in the service units becomes exhausted in terms of its capacity to remove dissolved solids or suspended solids, i.e., anions and cations, as indicated by detection of a lower than predetermined effluent quality, or when the pressure drop in a service vessel exceeds a certain predetermined value, the service cycle is considered terminated. At this time, it becomes necessary to switch the condensate feed to another service vessel and to chemically treat the exhausted mixed resin for regeneration. The exhausted ion exchange resin is conventionally hydropneumatically transferred to the regeneration units.

It is common practice in the art to separate the anion-exchange resin from the cation-exchange resin for separate chemical regeneration by treatment with a base and an acid, respectively. As is well known to those skilled in the art, such separation is conventionally accomplished by passing water upwardly through the spent, mixed-resin mass to hydraulically stratify the resin, forming a floating bed of the less dense anion-exchange resin in the upper portion of the separation vessel and another floating bed of the more dense cation-exchange resin in the lower part of the vessel. These stratified and separated resin beds are then separated for chemical regeneration.

However, when the resins are hydraulically classified in the conventional manner, inevitably some cation resin is carried over with the anion resin in the form of either whole bead or fines and will thereby come into contact with the base, e.g., NaOH, during the anion regeneration. Stoke's law holds that the settling velocity of a particle is a function of its specific gravity and also its diameter. Since resin particles regurlarly have certain range of sizes, some small cation particles may settle at the same level as some larger anion particles simply because both have the same settling (rising) velocity. This is the basic reason why backwash separation will not get a clean cut separation. In the anion regeneration process, sodium sites will form on any cation resin fines which are present, which when returned to a service vessel and placed in a high pH envirornment, will leak through sodium ions. This leakage of sodium ions can cause damage to a steam turbine power system.

Several patents have been issued covering means for dealing with the presence of cation-exchange resin fines in the anion-exchange resin regeneration zone. For example, U.S. Pat. No. 4,039,443 issued to Sentaroo Tahara et al, discloses treatment of the anion-exchange resin with an aqueous solution of hydrazine, after regeneration with caustic soda. U.S. Pat. No. 3,385,787 issued to Crits et al, U.S. Pat. No. 3,501,401 issued to Calmon et al, U.S. Pat. No. 3,583,908, issued to Crits and U.S. Pat. No. 3,709,818 issued to Gustafson et al also disclose a further chemical treatment of the anion resin to obviate the effect of the presence of cation fines. These supplemental chemical treatments are unsatisfactory for the reason that they add an additional recurring cost.

U.S. Pat. No. 3,582,504 issued to Salem et al and U.S. Pat. No. 3,826,761 issued to Short, also address the problem posed by the presence of cation fines in the anion resin and propose a process for the physical separation of those fines which utilizes a liquid having a density intermediate the density iof the anion exchange resin and that of the cation exchange resin. However, the use of a special density liquid introduces another separation problem as well s other process problems and cost.

SUMMARY OF THE INVENTION

In one embodiment of the present invention the spent, mixed resin bed (containing cation and anion-exchange resins of different densities) is backwashed to stratify it and separate it into an upper floating bed containing the anion-exchange resin and a lower floating bed containing the major portion of the cation-exchange resin. The major portion of the upper floating bed, consisting mainly of anion-exchange resin, is transferred from the backwashing vessel to a separate vessel for chemical regeneration with any suitable base, e.g., NaOH. A second cut is then removed from the backwashing vessel which cut encompasses the original interface between the upper stratified anion-exchange bed and the lower bed containing the cation-exchange resin. This second cut will contain the remainder of the anion-exchange resin not removed with the first cut as well as a small or minor portion of the cation exchange resin. This second resin cut is transfered to yet another treatment zone wherein it is physically separated into cation and anion resin portions. The remainder of the stratified ion exchange resin in the backwashing vessel consists of cation-exchange resin which may be regenerated with any suitable acid, e.g., $H_2SO_4$, either in the backwashing vessel or in another vessel. After regeneration, the anion and cation resins, the first and third cuts, are recombined for reuse in a service vessel.

Two or more service vessels may be used for continuous treatment of condensate water or other aqueous process stream, with one of the service vessels being held in stand-by condition to receive the condensate stream upon exhaustion of the resin bed in the other service vessel.

In one embodiment of the present invention, the cation resin portion of the interfacial resin cut is combined with the cation resin of the third resin cut for regeneration therewith. Likewise, the anion portion of the interfacial resin is combined with the anion-exchange resin of the first resin cut for regeneration. Alternatively, the cation resin portion of the interfacial resin cut may be discarded.

The interfacial resin cut is physically separated into the anion and cation resin portions in a screening vessel which has a screen provided in the upper portion thereof, the screen being a mesh size which allows passage of the cation resin granules but retains the anion resin granules. The interfacial resin cut is introduced into the screening vessel beneath the screen and backwashed against the screen to effect the separation. The interfacial resin cut is hydraulically separated into the anion and cation resin portions.

All three resin cuts of any single batch of exhausted resin may be treated in accordance with any of the embodiments described above and returned together, after regeneration, to a single service vessel. Alternatively, the interfacial resin cut is not returned to a service vessel. Rather, it is added to the backwashing vessel prior to or with the next batch of exhausted resin and the regenerated first and third cuts alone are returned to a service vessel along with a requisite amount of fresh resin.

In yet another embodiment of the present invention the upper anion resin bed, formed by stratification in the backwashing vessel, is routed to a screening vessel wherein it is backwashed against a screen for removal of the cation fines prior to or after regeneration with a suitable base.

Accordingly, it is an object of the present invention to provide a simplified process for the physical separation of cation fines from the hydraulically separated anion resin cut.

This and other objects and advantages of the present invention will become more apparent from a reading of the detailed description of various embodiments.

BRIEF DESCRIPTION OF THE DRAWINGS

FIG. 1(a)–FIG. 1(i) illustrate an embodiment of the present invention wherein an exhausted mixed resin bed is separated into three cuts for regeneration;

FIG. 2 illustrates one embodiment of a resin separation/cation resin regeneration vessel;

FIG. 3 illustrates yet another embodiment of the present invention wherein an exhausted mixed resin bed is separated into three cuts for regeneration.

DETAILED DESCRIPTION OF THE INVENTION

In its preferred embodiments, the present invention is a unique, simplified physical separation of a hydraulically stratified resin bed into three resin cuts, the second or "interfacial" resin cut being subjected to a further physical separation. This physical, i.e., mechanical, separation of the second resin cut is a hydraulic separation which, in the preferred embodiments, is combined with simultaneous screening. As is well known in the art, in a hydraulic separation, the mixed resin is backwashed in a process in which the direction of the liquid flow through the resin is upward, against gravity. It can readily be appreciated that if the liquid flow were downward, there could be no hydraulic separation or stratification of the mixed resin in accordance with particle density.

Figure 1E:
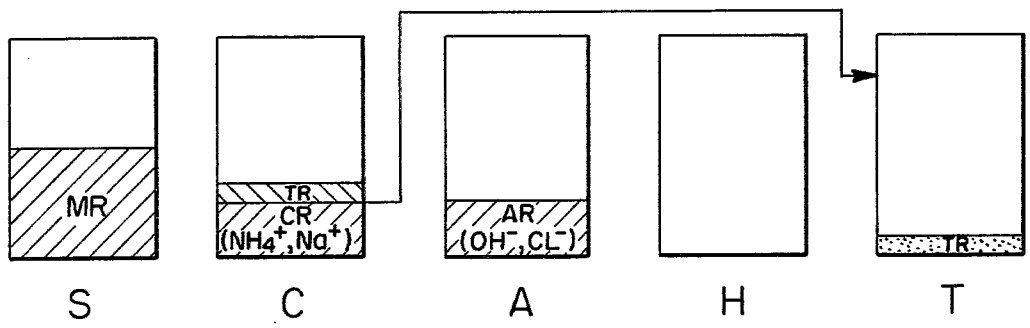
Figure 1F:
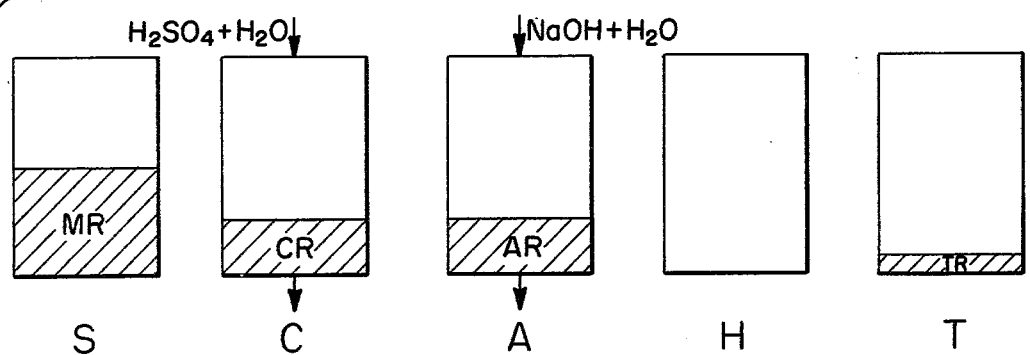
Figure 1G:
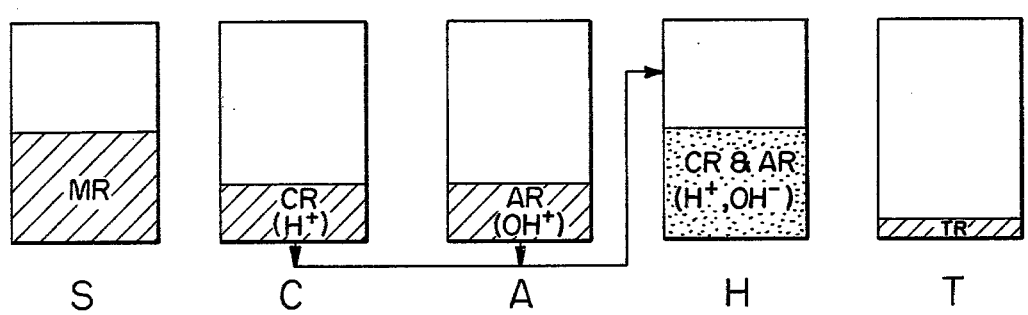
Figure 1H:
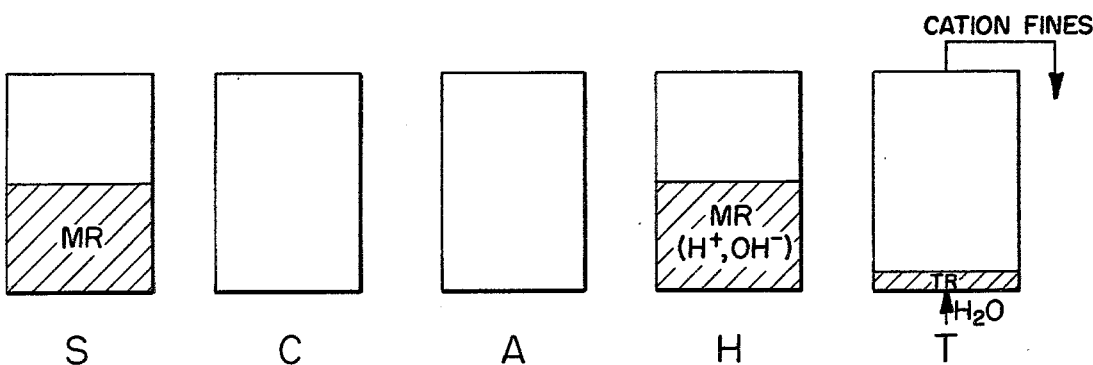

In the embodiment described by FIG. 1(a) through FIG. 1(i), an interfacial resin cut TR ("trouble resin") is removed from each batch of exhausted resin after stratification by backwashing. This interfacial resin cut TR, or at least a portion thereof, is not returned to a service vessel but, rather, after a physical treatment is returned to the backwashing vessel for mixing with the next batch of exhausted resin. FIG. 1(a) illustrates the transfer of an exhausted bed of mixed resin MR from a service vessel to a cation regeneration vessel C, wherein it is mixed with a interfacial resin cut or trouble resin TR from a previously treated batch of exhausted resin. As shown in FIG. 1(b), the service vessel S is then replenished by a fresh mixed resin MR from a hold tank H. In the next step, (FIG. 1(c)) backwash water is introduced into C at a controlled rate consistent with the resin densities, effecting a classification of the resin bed. As illustrated in the drawing, the lighter density anion resin AR will move toward the upper portion of the bed, while the cation resin CR will occupy the lower portion of the bed, with an interfacial zone of trouble resin TR in between. The anion resin AR is separately removed to the anion regeneration tank A (FIG. 1(d)) and then the trouble resin TR is separately removed to a trouble resin hold vessel T (FIG. 1(e)). The point of removal for the anion resin AR is selected to assure that the anion resin contains little or no trouble resin TR or cation resin CR. Naturally, a substantial amount of anion resin (although a minor portion) will remain in the cation regeneration vessel. However, the amount of trouble resin mixed with the exhausted mixed resin in the first step (FIG. 1(a)) represents an amount predetermined to replace the amount of anion exchange resin which will be removed in the trouble resin cut of the next bath (FIG. 1(e)). The amount of trouble resin removed to tank T (FIG. 1(e)) is predetermined to insure that no anion resin will remain with the cation resin in tank C, thus avoiding osmotic shock during acid regeneration of the cation resin. Next, the cation resin CR and the anion resin AR are separately regenerated with sulfuric acid and caustic, respectively, (FIG. 1(f)). The regenerated resins from tanks C and A are then transfered to a hold tank H where they are mixed and rinsed to ready a mixed resin bed for reuse in service vessel S (FIG. 1(g)). The trouble resin TR in tank T is vigorously backwashed with water for removal of fines and fractured beads, if any (FIG. 1(h)). If the amount of resin lost in backwashing the trouble resin TR is significant, or as it becomes significant, the amount of trouble resin returned to tank C, after backwashing, for mixing with the next batch of exhausted resin, may be supplemented with an amount of fresh resin equal to that lost upon backwashing (FIG. 1(i)). It can be appreciated from the foregoing, that an interfacial or trouble resin cut is removed from each batch of exhausted resin prior to chemical regeneration of that exhausted resin and return to a service vessel. In this way, the presence of cation fines in the resin supplied to the service vessel is avoided.

In the embodiment illustrated in FIG. 1(a) through FIG. 1(i), the mixed resin will consist, for example, of cation-exchange resin and anion-exchange resin in a 50:50 ratio, with about 20% of the total resin volume being removed as the trouble resin portion. The interfacial trouble resin being removed and added to the next batch for backwash separation in C serves as a partition between pure cation and anion resins. This partition will assure that no substantial amount of cation resin is trapped in the anion zone or vice versa. In this manner, sodium leakage should be decreased or eliminated.

FIG. 2 discloses an example of apparatus suitable for use in the previously described process of FIG. 1(a) through FIG. 1(i) in which a backwashed and stratified mixed resin is separated as three cuts or portions. A cation separation tank, generally designated by the numeral 10, is backwashed by water introduced at 12 for stratification of a mixed resin. The upper, anion resin is removed at 14 for transfer to the anion regeneration tank (not shown). The second cut consisting of the "trouble resin" is separately removed through an internal perforated pipe or pipes 16 and hydraulically conveyed to a hopper 18 where it in turn is backwashed for removal of the cation fines.

In a modification of the process described above, the trouble resin tank T is provided with a screen in its upper portion. Through calculation, it has been found that 16-25 mesh SBR-P resin has the same settling velocity as 30-50 mesh HGR-W resin. By using a 30-mesh screen, cation resin can be sluiced through the screen while retaining the anion particles of the trouble resin or interfacial cut. As shown in FIG. 3, after the exhausted, mixed resin is backwashed and stratified in tank C, the anion cut is transferred (1) to the anion regeneration tank A. The trouble resin cut is then transferred to the screening tank (2) and subsequently backwashed with water to remove cation resin which passes through the screen (3). Finally, the anion resin remaining in the trouble resin tank T is sluiced to the anion regeneration tank. At the conclusion of these steps, the cation regeneration tank contains both the cation resin cut CR and the cation resin from the trouble resin TR which washed through the screen in the backwashing operation in tank T. Likewise, the anion regeneration tank contains both the anion resin cut AR and the anion resin portion of the trouble resin sluiced out of tank T. These combined cation and anion resin portions are then separately, chemically regenerated as in the previous embodiment and recombined for reuse in a service vessel. In this embodiment, all of the exhausted resin from a single batch is regenerated and returned together to a service vessel for reuse. No portion of a given batch remains behind for mixing in combination with a subsequent batch as in the previously described embodiment.

Figure 4:
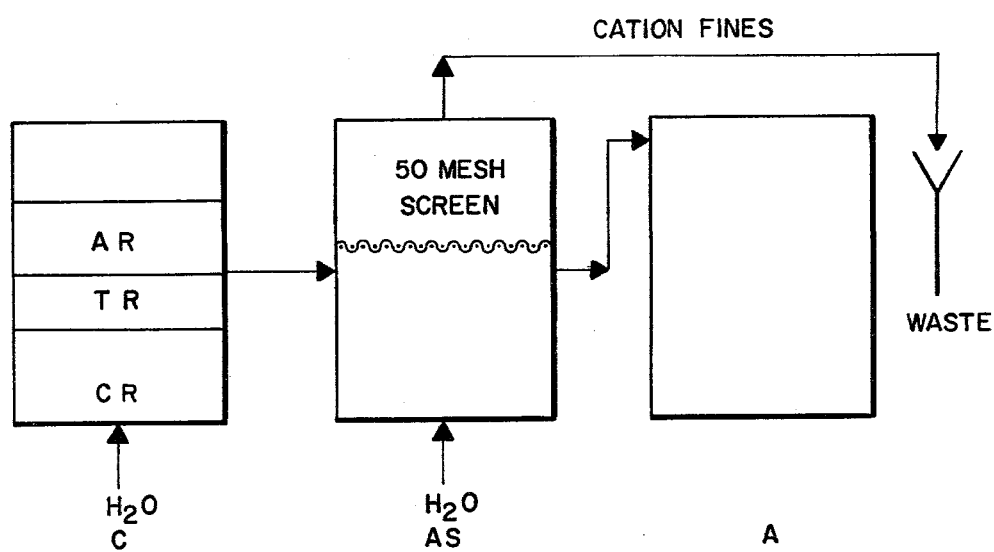
FIG. 4 illustrates an embodiment wherein the major portion of the anion resin is separated from the mixed resin bed, screened and regenerated.

In the embodiment illustrated in FIG. 4, an exhausted mixed resin bed is backwashed and stratified in the cation regeneration vessel C as in the previous embodiments. However, the embodiment of FIG. 4 differs in that the anion resin cut AR is transferred to an anion resin screening tank AS, wherein it is backwashed against a 50-mesh screen to separate and remove cation fines which are discarded. The screened anion resin is then transferred to the anion regeneration vessel A for regeneration with NaOH, as in the previously described embodiments. It can be readily appreciated, that the process modification involving anion resin screening depicted in FIG. 4 may be combined, if desired, with either of the previously described embodiments.

Those skilled in the art will appreciate that the invention may be embodied in other specific forms without departing from its spirit or essential characteristics. Accordingly, the foregoing embodiments are to be considered in all respects as illustrative and not restricted, the scope of the invention being indicated by the appended claims rather than by the foregoing description, and all changes which come within the meaning and range of equivalency of the claims are therefore intended to be embraced therein.

What is claimed is:

1. A process for the regeneration of a spent mixed bed of cation and anion exchange resins having different densities, said process comprising:
   (a) backwashing said spent mixed resin bed in a vessel to separate it into a first floating bed containing anion exchange resin granules and a minor amount of cation-exchange resin granules and a second floating bed containing the major part of the cation exchange resin;
   (b) removing the major portion of the first floating bed from the vessel as a first cut;
   (c) removing a second cut of resin granules consisting of the remainder of said first floating bed and a minor portion of said second floating bed, leaving the remainder of said second floating bed in the vessel as a third cut;
   (d) transferring said second resin cut to a treatment zone and physically separating it into a cation resin portion and an anion resin portion;
   (e) transferring said first resin cut to a anion resin treatment zone and contacting the resin with a base for regeneration of the anion resin;
   (f) contacting said third resin cut with an acid for regeneration of the cation resin; and
   (g) combining the regenerated cation resin of said third resin cut with the regenerated anion resin of said first resin cut to form a fresh mixed resin bed.

2. The process of claim 1 wherein said cation resin portion of said second resin cut is combined with said third resin cut for regeneration and said anion portion of said second resin cut is combined with said first resin cut for regeneration.

3. The process of claim 1 wherein said spent mixed resin bed is transferred to the vessel for backwashing from a service vessel and wherein said regenerated first and third resin cuts are returned to a service vessel, and said second resin cut or a portion of said second resin cut remaining after physical separation in step (d) is subsequently returned to the vessel for backwashing with a subsequent batch of exhausted, mixed resins.

4. The process of claim 2 or 3 wherein said treatment zone for physical separation of said second resin cut is provided in a screening vessel having a screen mounted in the upper portion thereof, said screen having a mesh size that allows passage of cation resin and retains anion resin, and wherein said second resin cut is introduced into the screening vessel beneath the screen and backwashed against the screen for the separation.

5. The process of claim 1 wherein said cation resin portion of said second resin cut is discarded and said anion resin portion of said second resin cut is combined with said first resin cut.

6. The process of claim 2 or 5 wherein said second resin cut is separated hydraulically by backwashing.

7. The process of claim 2 or 3 wherein said second resin cut is backwashed against a screen for removal of cation fines prior to regeneration.

8. The process of claim 4 wherein said second resin cut is backwashed against a screen for removal of cation fines prior to regeneration.

9. A process for the regeneration of a spent mixed bed of cation and anion exchange resin having different densities, said process comprising:
   (a) backwashing said spent mixed resin bed in a first vessel to separate it into a first floating bed containing anion exchange resin granules and a minor amount of cation exchange resin granules and a second floating bed containing the major part of the cation exchange resin;
   (b) removing the major portion of the first floating bed from the first vessel as a first cut, leaving behind a second resin cut;
   (c) backwashing said first cut against a screen provided in the upper portion of a second vessel for removal of fines;
   (d) contacting the first resin cut with a base for regeneration of the anion resin;
   (e) contacting said second resin cut with an acid for regeneration of the cation resin; and
   (f) combining the regenerated anion and cation resins to form a fresh mixed resin bed.

* * * * *